(12) United States Patent
Matsui (10) Patent No.: US 9,982,195 B2
(45) Date of Patent: May 29, 2018

(54) FLAME RETARDANT, FLAME RETARDANT COMPOSITION AND SHAPED BODY

(71) Applicant: Konoshima Chemical Co., Ltd., Osaka (JP)

(72) Inventor: Seiji Matsui, Kagawa (JP)

(73) Assignee: Konoshima Chemical Co., Ltd., Osaka (JP)

( * ) Notice: Subject to any disclaimer, the term of this patent is extended or adjusted under 35 U.S.C. 154(b) by 328 days.

(21) Appl. No.: 14/768,202

(22) PCT Filed: Aug. 12, 2013

(86) PCT No.: PCT/JP2013/071754
§ 371 (c)(1),
(2) Date: Aug. 14, 2015

(87) PCT Pub. No.: WO2014/128993
PCT Pub. Date: Aug. 28, 2014

(65) Prior Publication Data
US 2015/0376507 A1    Dec. 31, 2015

(30) Foreign Application Priority Data

Feb. 19, 2013 (JP) .................................. 2013-030181

(51) Int. Cl.
*C09K 21/02* (2006.01)
*C01F 5/22* (2006.01)
*C08K 9/04* (2006.01)

(52) U.S. Cl.
CPC ................ *C09K 21/02* (2013.01); *C01F 5/22* (2013.01); *C08K 9/04* (2013.01); *C01P 2004/03* (2013.01);
(Continued)

(58) Field of Classification Search
None
See application file for complete search history.

(56) References Cited

U.S. PATENT DOCUMENTS 4,615,831 A    10/1986 Kanno et al.
4,698,379 A *  10/1987 Nakaya .................. B82Y 30/00
                                                    423/635
(Continued)

FOREIGN PATENT DOCUMENTS

CN    101090956 A    12/2007
EP    1 942 173      7/2008
(Continued)

OTHER PUBLICATIONS

Extended Search Report received for European Patent Application No. 13875907.1 dated Nov. 24, 2015, 7 pages.
(Continued)

*Primary Examiner* — Joseph D Anthony
(74) *Attorney, Agent, or Firm* — Foley & Lardner LLP; Antoinette F. Konski (57) ABSTRACT

Provided are a flame retardant which is good in dispersibility in an organic polymeric material, and does not lower, even after mixed with an organic polymeric material, material properties thereof; a flame retardant composition; and a shaped body. The flame retardant of the present invention includes magnesium hydroxide particles subjected to a surface treatment, the particles satisfying the following (A) to (D): (A) an average particle size is 2 μm or less according to a laser diffraction method; (B) a BET specific surface area is 3 to 15 m²/g; (C) a degree of mono-dispersion is 50% or more, the degree of mono-dispersion being represented by the following equation: Degree of mono-dispersion (%)= (average primary particle size [μm] of particles according to SEM observation/average particle size [μm] of particles according to laser diffraction method)×100; and, (D) just after 1 mL of a 0.1 M solution of nitric acid is dropwise added at a dropping rate of 0.1 mL/minute to a suspension obtained by adding 1.0 g of the flame retardant to 100 mL of an aqueous mixed solution containing 0.1% by weight of (Continued)

each of a wetting agent and an electrolyte, pH of the suspension is 9.0 or less according to a potentiometric titration.

6 Claims, 1 Drawing Sheet

(52) U.S. Cl.
CPC ...... *C01P 2004/50* (2013.01); *C01P 2004/51* (2013.01); *C01P 2004/62* (2013.01); *C01P 2006/12* (2013.01); *C08K 2201/003* (2013.01); *C08K 2201/006* (2013.01)

(56) References Cited

U.S. PATENT DOCUMENTS

| | | | | |
|---|---|---|---|---|
| 5,057,367 | A * | 10/1991 | Morii | C08K 3/22 174/110 SR |
| 5,143,965 | A * | 9/1992 | Mertz | C01F 5/14 106/461 |
| 5,872,169 | A * | 2/1999 | Elsner | C01F 5/20 423/635 |
| 2007/0249756 | A1 | 10/2007 | Okoshi et al. | |
| 2008/0169201 | A1* | 7/2008 | Maddan | C09C 1/0018 205/508 |
| 2009/0182082 | A1 | 7/2009 | Matsui | |

FOREIGN PATENT DOCUMENTS

| | | |
|---|---|---|
| JP | 60-057457 A | 7/1979 |
| JP | 60-110738 A | 6/1985 |
| JP | 2003-83950 A | 3/2003 |
| JP | 2005-336472 A | 12/2005 |
| JP | 2007-16153 A | 1/2007 |
| JP | 2009-114016 A | 5/2009 |
| TW | 200716727 A | 5/2007 |
| WO | WO-98/46673 | 10/1998 |
| WO | WO 2000/035808 A1 | 6/2000 |
| WO | WO-2007/049598 A1 | 5/2007 |
| WO | WO-2008/004133 | 1/2008 |
| WO | WO 2012/008596 A1 | 1/2012 |

OTHER PUBLICATIONS

International Search Report (ISA/JP) dated Nov. 5, 2013, 2 pages.
Second Office Action in Chinese Application No. 201380073408.5, dated Jun. 27, 2017.
First Office Action in Chinese Application No. 201380073408.5, dated Dec. 23, 2016.
First Office Action in Taiwanese Application No. 103105474, dated Jan. 23, 2017.
Office Action in Korean Application No. 10-2015-7016933, dated Feb. 6, 2017.
English Translation of the International Preliminary Report on Patentability (ISA/JP) for International Application No. PCT/JP2013/071754, dated Sep. 3, 2015, 6 pages.
Decision on Rejection in Chinese Application No. 201380073408.5, dated Jan. 11, 2018.

* cited by examiner

FLAME RETARDANT, FLAME RETARDANT COMPOSITION AND SHAPED BODY

CROSS-REFERENCE TO RELATED APPLICATIONS

This application is a national stage application under 35 U.S.C. § 371 of International Application No. PCT/JP2013/071754, filed Aug. 12, 2013, which in turn claims priority to Japanese Application No. 2013-030181, filed Feb. 19, 2013, the content of each of which is incorporated herein by reference in its entirety.

TECHNICAL FIELD

The present invention relates to a flame retardant, a flame retardant composition, and a shaped body.

BACKGROUND ART

Hitherto, halogen-containing flame retardants have been widely used, which are made mainly of an organic halide (mainly bromide), in order to impart flame retardance to shaped bodies made of organic polymeric materials, such as plastic products or synthetic fibers. Halogen-containing flame retardants have an excellent flame retardant effect; however, the halogen gas generated by decomposition upon a shaping process may corrode the shaping and processing machine, or may produce an adverse effect onto physical properties of the shaped body itself. Thus, as an alternative thereto, so-called non-halogen type flame retardants of various types have been developed.

Magnesium hydroxide is a nonpoisonous inorganic substance, and contains no halogen and is friendly to the environment. Thus, this substance has been widely used as a typical non-halogen type flame retardant. Considering that magnesium hydroxide is an inorganic substance, a surfactant may be used together therewith to attain, for example, an improvement of this substance in dispersibility in organic polymeric materials (Patent Document 1), and magnesium hydroxide particles are surface-treated with a surfactant, and then the surface-treated particles may be used (Patent Document 2).

PRIOR ART DOCUMENT

Patent Document

Patent Document 1: JP-A-S60-110738
Patent Document 2: JP-B-S60-57457

SUMMARY OF THE INVENTION

Problems to be Solved by the Invention

However, with respect to conventional surface-treated magnesium hydroxide-based flame retardants, the level or degree to which the surface treatment is conducted (i.e., the surface treatment level) is insufficient. Consequently, the flame retardants may not be good in workability when each mixed with an organic polymeric material, or in material properties of a kneaded product to be obtained.

Thus, an object of the present invention is to provide a flame retardant which is good in dispersibility in an organic polymeric material, and does not lower, even after mixed with an organic polymeric material, material properties thereof; a flame retardant composition; and a shaped body.

Means for Solving the Problems

The present inventor has repeatedly made eager investigations about the form of magnesium hydroxide particles, and the surface-treated state thereof to find out that the above-mentioned problems can be solved by surface-treating magnesium hydroxide particles having a predetermined particle form. The present invention has been achieved based on this finding.

The flame retardant of the present invention includes magnesium hydroxide particles subjected to a surface treatment, the particles satisfying the following (A) to (D):

(A) an average particle size is 2 μm or less according to a laser diffraction method;

(B) a BET specific surface area is 3 to 15 $m^2/g$;

(C) a degree of mono-dispersion is 50% or more, the degree of mono-dispersion being represented by the following equation:

Degree of mono-dispersion (%)=(average primary particle size [μm] of particles according to SEM observation/average particle size [μm] of particles according to laser diffraction method)× 100; and (D) just after 1 mL of a 0.1 M solution of nitric acid is dropwise added at a dropping rate of 0.1 mL/minute to a suspension obtained by adding 1.0 g of the flame retardant to 100 mL of an aqueous mixed solution containing 0.1% by weight of each of a wetting agent and an electrolyte, pH of the suspension is 9.0 or less according to a potentiometric titration.

In the flame retardant, the magnesium hydroxide simultaneously satisfies the specific requirements (A) to (D); thus, the surface treatment of the magnesium hydroxide particles is conducted at the level of primary particles. This makes it possible that the flame retardant is excellent in dispersibility in an organic polymeric material and ensures, even after blended with an organic polymeric material, good properties without lowering material properties thereof.

With respect to the requirement (A), if the average particle size according to a laser diffraction method is more than 2 μm, the flame retardant is lowered in dispersibility in an organic polymeric material (and in a subsequently obtained shaped body) so that an energy necessary for the kneading may increase, or the shaped body to be obtained may be lowered in tensile elongation. With respect to the requirement (B), if the BET specific surface area is more than 15 $m^2/g$, the flame retardant is liable to aggregate when being blended with an organic polymeric material. Thus, the flame retardant is lowered in dispersibility in the organic polymeric material (or in a shaped body), so that the shaped body is lowered in tensile elongation. Contrarily, if the BET specific surface area is less than 3 $m^2/g$, the flame retardance is lowered. With respect to the requirement (C), if the degree of mono-dispersion is less than 50%, the magnesium hydroxide particles are present not in a primary particle state but in an aggregated state, so that particles present near the respective centers of the aggregates are insufficiently subjected to the surface treatment. In the case of attempting to blend the flame retardant containing the aggregates with an organic polymeric material, the aggregates are crashed by shearing stress generated in the kneading. Consequently, magnesium hydroxide particles insufficiently subjected to the surface treatment are exposed. At this time, the magnesium hydroxide particles insufficiently subjected to the surface treatment are brought into contact with the organic polymeric material so that an unintended reaction is caused. Thus, the resultant shaped body is lowered in material properties (for example, tensile elongation). With respect to the requirement (D), if the pH of the suspension is more than 9.0 after the nitric acid titration, the surface treatment of the magnesium hydroxide particles becomes insufficient. Also in this case, the magnesium hydroxide particles are brought into contact with the organic polymeric material so that an unintended reaction is caused. Thus, the resultant shaped body is lowered in material properties (for example, tensile elongation). In the present specification, regarding the average primary particle size according to the SEM observation, the average particle size according to the laser diffraction method, the BET specific surface area, and the potentiometric titration, a method for measuring each of these properties is according to a method described in Examples, which will be described later.

In the flame retardant, it is preferred that the surface treatment is conducted by use of at least one selected from the group consisting of higher fatty acids, higher fatty acid alkali metal salts, coupling agents, esters made from a fatty acid and a polyhydric alcohol, and phosphates made from phosphoric acid and a higher alcohol. This makes it possible to improve the magnesium hydroxide particles further in dispersibility in the organic polymer material (and in the shaped body).

In the flame retardant, it is preferred that the surface treatment is conducted by a wet method. When the surface treatment of the magnesium hydroxide particles is conducted by a wet method, the surface treatment can be attained at the level of primary particles so that the flame retardant can be heightened in dispersibility and further the shaped body can be more effectively restrained from being lowered in properties.

Another aspect of the present invention is a flame retardant composition, including an organic polymeric material, and the flame retardant in an amount of 5 to 500 parts by mass based on 100 parts by mass of the organic polymeric material. Since the flame retardant composition includes the flame retardant good in dispersibility and surface-treated state, the composition can exhibit flame retardance sufficiently. Additionally, a shaped body obtained from the composition is restrained from being lowered in properties, so that the shaped body can ensure desired properties.

Still another aspect of the present invention is a shaped body obtained by use of the flame retardant composition.

MODES FOR CARRYING OUT THE INVENTION

An embodiment of the present invention will be described hereinafter. A flame retardant of the embodiment includes magnesium hydroxide particles subjected to a surface treatment, the particles satisfying the following (A) to (D): (A) an average particle size is 2 μm or less according to a laser diffraction method (hereinafter, the wording "average particle size according to a laser diffraction method" may be referred to merely as "average particle size"); (B) a BET specific surface area is 3 to 15 m$^2$/g; (C) a degree of mono-dispersion is 50% or more, the degree of mono-dispersion being represented by the following equation:

Degree of mono-dispersion (%)=(average primary particle size [μm] of particles according to SEM observation/average particle size [μm] of particles according to laser diffraction method)× 100

(the wording "average primary particle size according to an SEM observation" may be referred to merely as "average primary particle size"); and (D) just after 1 mL of a 0.1 M solution of nitric acid is dropwise added at a dropping rate of 0.1 mL/minute to a suspension obtained by adding 1.0 g of the flame retardant to 100 mL of an aqueous mixed solution containing 0.1% by weight of each of a wetting agent and an electrolyte, pH of the suspension is 9.0 or less according to a potentiometric titration. Since the present flame retardant contains the surface-treated magnesium hydroxide particles satisfying the (A) to (D), the flame retardant is excellent in dispersibility in an organic polymeric material by the surface treatment at the level of primary particles. Additionally, the flame retardant can give a shaped body exhibiting desired properties.

[(A) Average Particle Size According to a Laser Diffraction Method]

It is sufficient that the upper limit of the average particle size of the magnesium hydroxide particles is 2 μm. The upper limit is preferably 1.5 μm, more preferably 1.2 μm. Contrarily, the lower limit of the average particle size is not particularly limited. The lower limit is preferably 0.1 μm, more preferably 0.3 μm from the viewpoint of the prevention of the aggregation. When the average particle size of the magnesium hydroxide particles is set into the range, the magnesium hydroxide particles exhibit dispersibility sufficient for giving flame retardance to the flame retardant and can be additionally restrained from being aggregated so that surface treatment for each particle can be conducted at a satisfactory level.

[(B) BET Specific Surface Area]

The BET specific surface area of the magnesium hydroxide particles is not particularly limited as far as this surface area ranges from 3 to 15 m$^2$/g. The BET specific surface area ranges preferably from 4 to 10 m$^2$/g, more preferably from 5 to 8 m$^2$/g. When the BET specific surface area is set into the range, the magnesium hydroxide particles can allow the flame retardant to ensure flame retardance and can be further restrained from being aggregated to be improved in dispersibility and surface treatment level. As a result, a flame retardant composition and a shaped body that have desired properties can be obtained.

[(C) Degree of Mono-dispersion]

The degree of mono-dispersion of the magnesium hydroxide particles is an index representing the proportion of magnesium hydroxide particles kept in the state of primary particles with respect to the entire magnesium hydroxide particles. As the degree of mono-dispersion is higher, a larger proportion of the magnesium hydroxide particles is present in the form of primary particles. As the degree of mono-dispersion is lower, a larger proportion of the magnesium hydroxide particles is present in the form of secondary particles, in which the primary particles are aggregated. In the measurement of the degree of mono-dispersion, the following ratio is used: the ratio between the average primary particle size according to the SEM observation and the average particle size according to the laser diffraction method. This is because any SEM observation is suitable for measuring primary particle sizes of particles and any laser diffraction method is suitable for measuring the average particle size thereof (the average of mixed particle sizes of primary particle sizes and secondary particle sizes thereof).

The degree of mono-dispersion is not particularly limited as far as the lower limit of the degree is 50%. The lower limit is preferably 55%, more preferably 60%. When the degree of mono-dispersion is set into the range, the magnesium hydroxide particles can be kept in the state of primary particles to prepare a flame retardant good in dispersibility and surface-treated state. Although the upper limit of the degree of mono-dispersion is preferably 100%, the upper limit may be 90% or less because of physical restrictions.

[(D) pH after the Nitric Acid Titration]

The pH of the flame retardant suspension after the nitric acid titration is used as an index representing the surface-treated state of the magnesium hydroxide particles in the suspension (see Japanese Patent No. 4634671). Specifically, magnesium hydroxide particles show alkalinity; when the particles are not subjected to a surface treatment, an acid-base reaction advances between the magnesium hydroxide particles and nitric acid so that a high pH value is maintained; however, when the magnesium hydroxide particles are subjected to a surface treatment, the acid-base reaction is restrained or inhibited so that the pH is gradually lowered. Thus, by measuring the pH of the suspension after the nitric acid titration, an estimation can be made about the surface treatment (or surface coat) level of the magnesium hydroxide particles.

In the present invention, the magnesium hydroxide particles can be made into the state that the particles are surface-treated at the level of primary particles by adjusting the pH of the flame retardant-containing suspension after the nitration titration to 9.0 or less. As a result, also when the flame retardant is blended with an organic polymeric material, an intended reaction is restrained between the flame retardant and the organic polymeric material so that the organic polymeric material can be prevented from being lowered in properties. It is sufficient that the pH after the nitric acid titration is 9.0 or less. The pH is preferably 8.5 or less, more preferably 8.0 or less. As the lower limit of the pH is closer to 3.0 when the entire dropped amount of nitric acid remains, it is more preferred. However, the lower limit may be 3.5.

[Method for Producing Magnesium Hydroxide Particles]

Magnesium hydroxide particles are typically produced as follows: an aqueous solution of magnesium chloride or a hydrate thereof is prepared, and thereto is added an alkali (such as an aqueous solution of sodium hydroxide) to yield a suspension. Thereafter, this suspension is subjected to a hydrothermal treatment to yield a slurry. Next, the slurry is filtrated, washed and dried. In this way, desired magnesium hydroxide particles can be produced. When a surface treatment which is a subsequent step is conducted by a wet method, it is preferred to filtrate and wash the slurry subjected to the hydrothermal treatment, return the resultant filtrate again into pure water to be made into a magnesium hydroxide slurry, and then add an agent for the surface treatment to the slurry. The hydrothermal treatment may be conducted at 100 to 250° C. under stirring in a known pressure-resistant heating vessel such as autoclave for about 1 to 10 hours.

[Surface Treatment]

The magnesium hydroxide particles contained in the flame retardant of the present invention are surface treated. An agent for the surface treatment may be a known compound used for a surface treatment purpose. The surface treatment is conducted preferably by use of at least one selected from the group consisting of higher fatty acids, higher fatty acid alkali metal salts, coupling agents, esters made from a fatty acid and a polyhydric alcohol, and phosphates made from phosphoric acid and a higher alcohol. This makes it possible to improve the magnesium hydroxide particles in dispersibility in the organic polymeric material (or a shaped body) and maintain or improve properties of the flame retardant composition and the shaped body obtained by the improvement in the dispersibility. A surfactant is usable as the surface treatment agent.

(Higher Fatty Acids, and Higher Fatty Acid Alkali Metal Salts)

Examples of the higher fatty acids include higher fatty acids each having 10 or more carbon atoms, such as stearic acid, erucic acid, palmitic acid, lauric acid, and behenic acid. Stearic acid is preferred from the viewpoint of dispersibility and handleability. Examples of the higher fatty acid alkali metal salts include alkali metal salts of the above-mentioned higher fatty acids. The alkali metal is preferably lithium, sodium, potassium or the like. The higher fatty acid alkali metal salts are preferred from the viewpoint of dispersibility. Of these salts, sodium stearate is more preferred. These acids or salts may be used alone or in any combination of two or more thereof.

(Coupling Agents)

Examples of the coupling agents include silane-based coupling agents such as γ-glycidoxypropyltrimethoxysilane, β-(3,4-epoxycyclohexyl)ethyltrimethoxysilane, γ-methacryloxypropyltrimethoxysilane, γ-methacryloxypropyltriethoxysilane, γ-acryloxypropylmethyl dimethoxysilane, vinyltriethoxysilane, vinyltriacetoxysilane, p-trimethoxysilylstyrene, p-triethoxysilylstyrene, p-trimethoxysilyl-α-methyl styrene, p-triethoxysilyl-α-methylstyrene, 3-aminopropyltrimethoxysilane, 3-aminopropyltriethoxysilane, N-2-(aminoethyl)-3-aminoropylmethyldimethoxysilane, N-2-(aminoethyl)-3-aminopropyltrimethoxysilane, N-2-(aminoethyl)-3-aminopropyltriethoxysilane, N-phenyl-3-aminopropyltrimethoxysilane, N-phenyl-3-aminopropyltriethoxysilane, N-propyl-3-aminopropyltrimethoxysilane, 4-aminobutyltrimethoxysilane, and decyltrimethoxysilane; titanate-based coupling agents such as isopropyltriisostearoyl titanate, isopropyltris(dioctylpyrophosphate) titanate, isopropyltri(N-aminoethyl-aminoethyl) titanate, and isopropyltridecylbenzenesufonyl titanate; and aluminum-based coupling agents such as acetoalkoxyaluminum diisopropionate. These coupling agents may be used alone or in any combination of two or more thereof.

(Esters Made from Fatty Acid and Polyhydric Alcohol)

Examples of the esters made from a fatty acid and a polyhydric alcohol include esters made form a polyhydric alcohol such as glycerin monostearate or glycerin monooleate and a fatty acid; and the like. Examples of the phosphates include a monoester made from orthophosphoric acid and oleyl alcohol, stearyl alcohol or the like, a diester made from the same, or a mixture of the two esters. The monoester, the diester or the mixture may be a phosphate in an acid form, or in the form of an alkali metal salt, an amine salt or the like.

(Phosphates Made from Phosphoric Acid and Higher Alcohol)

Examples of the phosphates made from phosphoric acid and a higher alcohol include a monoester made from orthophosphoric acid and oleyl alcohol, stearyl alcohol or the like, a diester made from the same, or a mixture of the two esters. The monoester, the diester or the mixture may be a phosphate in an acid form, or in the form of an alkali metal salt, an amine salt or the like.

(Surfactant)

Preferred examples of the surfactant include anionic surfactants, cationic surfactants, amphoteric surfactants, and nonionic surfactants.

(Anionic Surfactants)

Examples of the anionic surfactants include alkylsulfate salts such as sodium laurylsulfate, sodium higher alcohol sulfate, and triethanolamine laurylsulfate; alkylbenzene sulfate salts such as sodium dodecylbenzenesulfate; alkylnaphthalene sulfate salts such as sodium alkylnapthalenesulfate; alkylsulfosuccinate salts such as sodium dialkylsulfosuccinate; alkyldiphenyl ether disulfate salts such as sodium alkyldiphenyl ether disulfate; alkylphosphate salts such as potassium alkylphosphate; polyoxyethylene alkyl (or alkylallyl) sulfate salts such as sodium polyoxyethylene lauryl ether sulfate, sodium polyoxyethylene alkyl ether sulfate, triethanolamine polyoxyethylene alkyl ether sulfate, and sodium polyoxyethylene alkylphenyl ether sulfate; and the like.

(Cationic Surfactants and Amphoteric Surfactants)

Examples of the cationic surfactants and amphoteric surfactants include alkylamine salts such as coconutamine acetate and stearylamine acetate; quaternary ammonium salts such as lauryltrimethylammonium chloride, stearyltrimethylammonium chloride, cetyltrimethylammonium chloride, distearyldimethylammonium chloride, and alkylbenzyldimethylammonium chloride; alkylbetaines such as laurylbetaine, stearylbetaine, and laurylcarboxymethylhydroxyethylimidazolium betaine; amine oxides such as lauryldimethylamine oxide; and the like.

(Nonionic Surfactants)

Examples of the nonionic surfactants include polyoxyethylene alkyl ethers such as polyoxyethylene lauryl ether, polyoxyethylene cetyl ether, polyoxyethylene stearyl ether, polyoxyethylene oleyl ether, and polyoxyethylene higher-alcohol ether; polyoxyethylene alkylaryl ethers such as polyoxyethylene nonylphenyl ether; polyoxyethylene derivatives; sorbitan fatty acid esters such as sorbitan monolaurate, sorbitan monopalmitate, sorbitan monostearate, sorbitan tristearate, sorbitan monooleate, sorbitan trioleate, sorbitan sesquioleate, and sorbitan distearate; polyoxyethylene sorbitan fatty acid esters such as polyoxyethylene sorbitan monolaurate, polyoxyethylene sorbitan monolaurate, polyoxyethylene sorbitan monopalmitate, polyoxyethylene sorbitan monostearate, polyoxyethylene sorbitan tristearate, polyoxyethylene sorbitan monooleate, and polyoxyethylene sorbitan trioleate; polyoxyethylene sorbitol fatty acid esters such as polyoxyethylene sorbit tetraoleate; glycerin fatty acid esters such as glycerol monostearate, glycerol monooleate, and self-emulsifying glycerol monostearate; polyoxyethylene fatty acid esters such as polyethylene glycol monolaurate, polyethylene glycol monostearate, polyethylene glycol distearate, and polyethylene glycol monooleate; polyoxyethylene alkylamines; polyoxyethylene hardened castor oil; and alkylalkanolamides.

(Surface Treatment Method)

In order to conduct the surface treatment of the magnesium hydroxide particles with such a surface treatment agent, a known wet method is usable. A surface treatment based on a known dry method can be adopted as far as a desired surface treatment level can be attained. In the wet method, it is sufficient to add a surface treatment agent in a solution or emulsion form to a slurry of magnesium hydroxide yielded by the above-mentioned method for producing magnesium hydroxide particles, and then mix these components mechanically with each other at a temperature of, for example, about 5 to 95° C. In the dry method, it is sufficient to add a surface treatment agent in a liquid, emulsion or solid form to a powder of magnesium hydroxide under stirring by a mixer such as a Henschel mixer, and then mix these components sufficiently with each other while the components are heated or not heated. The surface treatment is conducted preferably by the wet method from the viewpoint of the fixability of the surface treatment agent onto the surface of the magnesium hydroxide particles. The added amount of the surface treatment agent may be appropriately selected. When the wet method is adopted, the amount ranges preferably from 0.1 to 10% by mass, more preferably from 0.3 to 7% by mass based on 100% by mass of the magnesium hydroxide particles in terms of conducting sufficient surface treatment and preventing the aggregation of the surface treatment agent. When the dry method is adopted, the surface treatment state attained is liable to be more uneven than when the wet method is conducted. Thus, it is advisable to make the added amount of the surface treatment agent large to a certain extent as compared with the wet method. Specifically, the amount ranges preferably from 0.5 to 15% by mass, more preferably from 1 to 10% by mass based on 100% by mass of the magnesium hydroxide particles.

The surface treated magnesium hydroxide particles are optionally subjected to an approach appropriately selected from washing with water, dehydration, granulation, drying, pulverization, classification and the like. In this way, a final product (flame retardant) can be prepared.

[Flame Retardant Composition]

The flame retardant composition of the present invention is obtained by blending 5 to 500 parts by mass of the flame retardant into 100 parts by mass of an organic polymeric material. The blended amount of the flame retardant is not particularly limited as far as the amount is within the range described above. The blended amount is preferably from 20 to 400 parts by mass based on 100 parts by mass of the organic polymeric material. It is sufficient to decide the blended amount, considering the flame retardance and properties of the flame retardant composition.

(Organic Polymeric Material)

The organic polymeric material may be any organic polymeric material that is usually usable for shaped bodies. Examples thereof include thermoplastic resins, thermosetting resins, synthetic rubbers, and other synthetic organic polymeric materials; natural rubbers, and other natural organic polymeric materials; and the like.

(Thermoplastic Resins)

Examples of the thermoplastic resins include polyolefin-based resins such as polyethylene, polypropylene, ethylene/propylene copolymer, polybutene, poly-4-methylpentene-1 and other C2 to C8 olefin (α-olefin) polymers and copolymers; any copolymer made from an olefin and a diene, ethylene/acrylate copolymer, polystyrene, ABS resin, AAS resin, AS resin, MBS resin, ethylene/vinyl chloride copolymer, ethylene/vinyl acetate copolymer, ethylene/vinyl chloride/vinyl acetate copolymer, polyvinylidene chloride, polyvinyl chloride, chlorinated polyethylene, chlorinated polypropylene, vinyl chloride/propylene copolymer, polyvinyl acetate, phenoxy resin, polyacetal, polyamide, polyimide, polycarbonate, polysulfone, polyphenylene oxide, polyphenylene sulfide, polyesters such as polyethylene terephthalate and polybutylene terephthalate, silicone resin, methacrylic resin, and the like. Of these thermoplastic resins, polyolefin-based resins, or olefin-based copolymers are preferred since the polymers exhibit a high flame retardant effect by the magnesium hydroxide particles, and are also excellent in mechanical strength.

(Thermosetting Resins)

Examples of the thermosetting resins include epoxy resins, phenolic resins, melamine resins, unsaturated polyester resins, alkyd resins, urea resins, and the like.

(Synthetic Rubbers)

Examples of the synthetic rubbers include EPDM, butyl rubber, isoprene rubber, SBR, NBR, chlorosulfonated polyethylene, NIR, urethane rubber, butadiene rubber, acrylic rubber, silicone rubber, fluorine-contained rubber, and the like.

(Flame Retardant Aid)

When a flame retardant aid is further blended into the flame retardant composition of the present invention, the proportion of the blended magnesium hydroxide particles can be reduced and further the composition can be improved in flame retardant effect. The flame retardant aid is preferably red phosphorous, a carbon powder, or a mixture thereof. The species of the red phosphorous may be an ordinary species of red phosphorous for flame retardants, or a species of red phosphorous that is surface-coated with, for example, a thermosetting resin, polyolefin, a carboxylic acid polymer, titanium oxide or a titanium aluminum condensate. The species of the carbon powder may be carbon black, activated carbon or graphite. The carbon black may be prepared by any method selected from an oil furnace method, a gas furnace method, a channel method, a thermal method and an acetylene method.

When the flame retardant aid is blended, the amount thereof ranges preferably from 0.5 to 20% by mass, more preferably from 1 to 15% by mass of the whole of the flame retardant composition.

(Other Additives)

Additives other than the above-mentioned components may be blended into the flame retardant composition of the present invention as far as the advantageous effects of the invention are not impaired. Examples of the additives include an antioxidant, an antistatic agent, a pigment, a foaming agent, a plasticizer, a filler, a reinforcing agent, any other flame retardant, a crosslinking agent, a light stabilizer, an ultraviolet absorbent, a lubricant, and the like.

[Shaped Body]

The shape body of the present invention is obtained by use of the flame retardant composition. The shaped body of the present invention can be obtainable by blending the predetermined amount of the magnesium hydroxide particles into a synthetic resin, and then shaping the resultant composition by a known shaping method. Examples of the shaping method include extrusion forming, injection molding, calendaring, and the like.

Since the shaped body of the present invention contains the above-mentioned predetermined magnesium hydroxide particles, the shaped body is excellent in flame retardance, properties and external appearance. The shaped body is usable for various applications for which flame retardance is required. Examples of applications include electric wire coats, housings of household electric appliances, wall paper sheets for building material, foaming heat-insulating materials, mats, connector parts for electrical/electronic members, sealing materials for semiconductors, prepregs, multi-layered circuit boards, laminated plates for circuit boards, highly-functional synthetic fibers, and the like.

EXAMPLES

Hereinafter, the present invention will be described in detail by way of Examples; however, the invention is not limited to Examples described below as far as the invention is not beyond the gist thereof.

[Production of Flame Retardants]

Example 1

High-purity $MgCl_2.6H_2O$ as a magnesium raw material was weighed to a weight of 480 g in a polyethylene vessel 3 L in volume. Thereto was added 1 L of pure water, and this system was stirred to prepare an aqueous solution of $MgCl_2$. While the solution was stirred, thereto was slowly added 510 mL of an alkali raw material, i.e., an aqueous 8.3 N solution of NaOH (ratio by mole number of $Mg^{2+}/OH^-=1/1.8$). Thereto was further added pure water to prepare 2 L of a suspension. This suspension was allowed to flow into an autoclave, 3 L in volume, having a liquid-contacting region made of hastelloy C-276. While stirred, the suspension was subjected to a hydrothermal treatment at 140° C. for 5 hours. After the hydrothermal treatment, the slurry was vacuum-filtrated, and then sufficiently washed with pure water the volume of which was at least 20 times larger than the volume of the resultant solid. Thereafter, the solid was again returned into pure water to prepare an emulsified slurry having a $Mg(OH)_2$ solid concentration of 10 g/dL. One liter of this emulsified slurry (corresponding to a $Mg(OH)_2$ solid mass of 100 g) was sampled into a vessel made of SUS 316 of 2 L volume. While stirred, the slurry was heated to 80° C. Thereafter, at 80° C., thereto was added an aqueous sodium stearate solution adjusted into a concentration of 5% by mass so that the amount in terms of the mass of stearic acid became 0.6% by mass with respect to the $Mg(OH)_2$ solid mass. The slurry was stirred at 80° C. for 1 hour to be surface treated by a wet method. The present system was then vacuum-filtrated, washed with water (volume: at least 5 times the mass of the $Mg(OH)_2$ solid), dried, and pulverized to yield a powder of a flame retardant.

Example 2

A flame retardant was produced in the same way as in Example 1 except that instead of 510 mL of the aqueous 8.3 N solution of NaOH as the alkali raw material, 630 mL of a $Ca(OH)_2$ slurry having a concentration of 25 g/dL was used, and the aqueous sodium stearate solution was added so that the amount in terms of the mass of stearic acid became 2.5% by mass with respect to the $Mg(OH)_2$ solid mass.

Example 3

A flame retardant was produced in the same way as in Example 1 except that the aqueous sodium stearate solution was added so that the amount in terms of the mass of stearic acid became 2.5% by mass with respect to the $Mg(OH)_2$ solid mass.

Comparative Example 1

A flame retardant was produced in the same way as in Example 1 except that no surface treatment was conducted.

Comparative Example 2

Into a Henschel mixer of 20 L in volume were charged 2 kg of the flame retardant powder of Comparative Example 1, which was not surface-treated, and 50 g of a stearic acid powder. The blended amount of stearic acid was 2.5% by mass of the flame retardant powder. In the Henschel mixer, the flame retardant powder was surface-treated by a dry method at 100° C. and a rotation number of 1900 rpm for 30 minutes to yield a flame retardant powder. In the same way as in Example 1 except this process, a flame retardant was produced.

Comparative Example 3

In a vessel, 3 L in volume, made of SUS 316, 270 g of a MgO powder having a BET specific surface area of 10 m²/g and 20 g of a NaOH solid were added to 2.4 L of pure water. While stirred, the system was heated to 80° C. and allowed to undergo a hydration reaction for 24 hours. After the hydration reaction, the slurry was vacuum-filtrated, and then sufficiently washed with pure water the volume of which was at least 20 times larger than the volume of the resultant solid. Thereafter, the solid was again returned into pure water to prepare an emulsified slurry having a $Mg(OH)_2$ solid concentration of 10 g/dL. The slurry was subjected to a surface treatment by a wet method so that the amount in terms of the mass of stearic acid became 2.5% by mass with respect to the $Mg(OH)_2$ solid mass. In the same way as in Example 1 except this process, a flame retardant was produced.

Comparative Example 4

High-purity $MgCl_2 \cdot 6H_2O$ as a magnesium raw material was weighed to a weight of 480 g in a polyethylene vessel 15 L in volume. Thereto was added 1 L of pure water, and this system was stirred to prepare an aqueous solution of $MgCl_2$. While the solution was stirred, thereto was slowly added 510 mL of an alkali raw material, i.e., an aqueous 8.3 N solution of NaOH (ratio by mole number of $Mg^{2+}/OH^-$ =1/1.8) to prepare a $Mg(OH)_2$ suspension. This $Mg(OH)_2$ suspension was used as a seed, and from above the suspension was added an aqueous $MgCl_2$ solution in which 480 g of high-purity $MgCl_2 \cdot 6H_2O$ was dissolved in 1 L of pure water. Furthermore, while the solution was stirred, thereto was slowly added 510 mL of an aqueous 8.3 N solution of NaOH. Thereafter, the solution was stirred for 5 minutes to conduct a first seed crystal reaction. Such a seed crystal reaction was repeated 8 times in total. The slurry after the seed crystal reaction was conducted 8 times was vacuum-filtrated, and then sufficiently washed with pure water the volume of which was at least 20 times larger than the volume of the resultant solid. Thereafter, the solid was again returned into pure water to prepare an emulsified slurry having a $Mg(OH)_2$ solid concentration of 10 g/dL. This emulsified slurry was subjected to a surface treatment by a wet method so that the amount in terms of the mass of stearic acid became 2.5% by mass with respect to the $Mg(OH)_2$ solid mass. In the same way as in Example 1 except this process, a flame retardant was produced.

[Analyses and Evaluations of Flame Retardants]

With respect to each of the flame retardants obtained in Examples and Comparative Examples, analyses and evaluations described below were made. The results are shown in Table 1 described below.

(1) Average Particle Size Measurement

Into a beaker 100 mL in volume was put 50 ml of ethanol, and thereto was added about 0.2 g of the powder of the flame retardant. The system was subjected to ultrasonic treatment for 3 minutes to prepare a liquid dispersion. A laser-diffraction/particle-size-distribution meter (Microtrac HRA, Model 9320-X100, manufactured by NIKKISO CO., LTD.) was used to measure this prepared liquid dispersion to give the $D_{50}$ value thereof by volume as an average particle size [μm].

(2) BET Specific Surface Area Measurement

A BET-specific surface area meter (β sorb, Model 4200, manufactured by NIKKISO CO., LTD.) was used to measure the BET specific surface area of the flame retardant.

(3) Degree of Mono-dispersion Measurement

Figure 1:
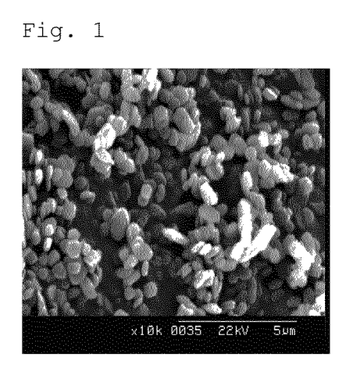
FIG. 1 is an SEM photograph of a flame retardant of Example 1 of the present invention.
Figure 2:
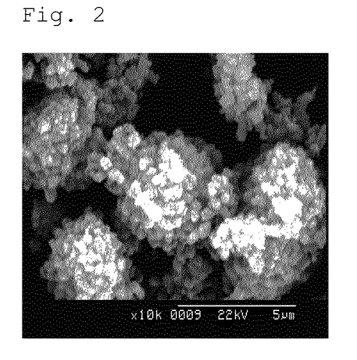
FIG. 2 is an SEM photograph of a flame retardant of Comparative Example 3 of the present invention.

A scanning electron microscope (SEM) (S-23620 N, manufactured by Hitachi Ltd.) was used to take a photograph of an image of particles of the flame retardant powder with magnifications of 10000. FIG. 1 is an SEM photograph of the flame retardant of Example 1, and FIG. 2 an SEM photograph of that of Comparative Example 3. Image analyzing software was used to select, at random, 50 out of primary particles of each of the individual flame retardants, and then the respective longest diameters of the primary particles were averaged. The degree of mono-dispersion was calculated in accordance with the following equation:

Degree of mono-dispersion(%)=(average [μm] of respective longest diameters of 50 primary particles, the diameters being obtained by image analysis)/(average particle size [μm] gained by laser diffraction method)×100

(4) Particle Surface-treated State Evaluation by Potentiometric Titration

Figure 3:
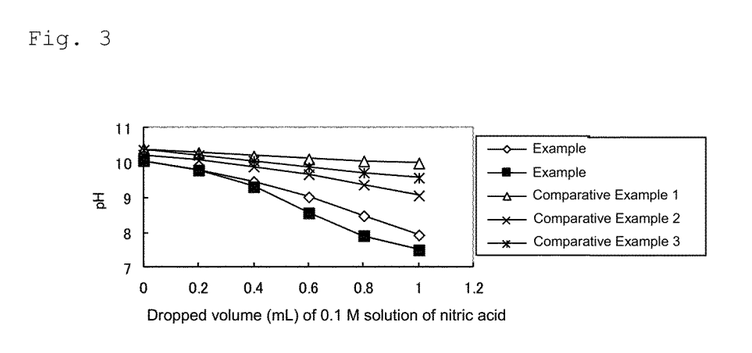
FIG. 3 is a graph of titration curves showing respective results of potentiometric titrations of the flame retardants in Examples of the present invention.

A volume of 100 mL was collected from an aqueous mixed solution containing 0.1% by weight of Triton X-100 as a wetting agent, and 0.1% by weight of lithium perchlorate as an electrolyte. Thereto was added 1.0 g of the flame retardant powder. A dispersion mixer was used to subject the mixture to dispersing treatment at 800 rpm for 10 minutes to prepare a suspension. While this suspension was bubbled with nitrogen gas at 25° C., an automatic titrating device (AT-400, manufactured by Kyoto Electronics Manufacturing Co., Ltd.) was used to drop an aqueous 0.1 M $HNO_3$ solution thereto at a rate of 0.1 mL/minute. A glass electrode was used to measure the pH of the titrated solution at 25° C. to obtain a titration curve. The titration curve of each of Examples 1 and 3, and Comparative Examples 1 to 3 is shown in FIG. 3. An acid-base reaction concerned with the titration is as described below. The surface treatment agent on the $Mg(OH)_2$ particle surfaces is reflected onto the titration curve in the state that the agent disturbs this reaction.

$Mg(OH)_2 + 2HNO_3 \rightarrow Mg(NO_3)_2 + 2H_2O$ (5) Melt-kneading Test

An EEA (ethylene/ethyl acrylate copolymer) resin (A-1150, manufactured by Japan Polyethylene Corporation) was used as a polyolefin resin. To 100 parts by mass of the EEA resin was added 100 parts by mass of the flame retardant powder, and these were melt-kneaded at 150° C. in a Laboplast mill (manufactured by Toyo Seiki Kogyo Co., Ltd.) for 5 minutes. In the kneading, the steady torque of the kneaded components was measured. When this kneading torque was 4.5 kgf·m or less as a target value, the flame retardant was judged to be good. When the torque was more than 4.5 kgf·m, the flame retardant was judged to be bad.

(6) Tensile Test

The kneaded product yielded in the item "(5) Melt-kneading test" was pressed and shaped at 150° C. to form a sheet shaped body having a thickness of 2 mm. This sheet shaped body was punched out into a dumbbell form. The resultant test piece was used to conduct a tensile test according to JIS K 7113. When the resultant tensile strength was 0.80 kgf/mm² or more as a target value, the flame retardant was judged to be good. When the tensile strength was less than 0.80 kgf/mm², the flame retardant was judged to be bad. When the resultant tensile elongation was 700% or more as a target value, the flame retardant was judged to be good. When the tensile elongation was less than 700%, the flame retardant was judged to be bad.

sufficient so that the flame retardant was improved in dispersibility in the resin and further reaction between the resin and the flame retardant was sufficiently restrained. However, Comparative Example 1 was raised in kneading torque, and was low in tensile elongation. It is considered that this was caused by the fact that the pH after the nitric acid titration

TABLE 1

|  |  |  | Example 1 | Example 2 | Example 3 | Comparative Example 1 | Comparative Example 2 | Comparative Example 3 | Comparative Example 4 |
|---|---|---|---|---|---|---|---|---|---|
| Magnesium raw material | Species |  | High-purity $MgCl_2 \cdot 6H_2O$ salt | High-purity $MgCl_2 \cdot 6H_2O$ salt | High-purity $MgCl_2 \cdot 6H_2O$ salt | High-purity $MgCl_2 \cdot 6H_2O$ salt | High-purity $MgCl_2 \cdot 6H_2O$ salt | Magnesium oxide | High-purity $MgCl_2 \cdot 6H_2O$ salt |
|  | Used amount |  | 480 g | 480 g | 480 g | 480 g | 480 g | 270 g | 480 g × 8 |
| Alkali raw material | Species |  | 8.3-N NaOH solution | 25 g/dL-$Ca(OH)_2$ slurry | 8.3-N NaOH solution | 8.3-N NaOH solution | 8.3-N NaOH solution | NaOH solid | 8.3-N NaOH solution |
|  | Used amount |  | 510 mL | 630 mL | 510 mL | 510 mL | 510 mL | 20 g | 510 mL × 8 |
| Reaction conditions |  | — | Autoclave | Autoclave | Autoclave | Autoclave | Autoclave | Normal pressure | Seed crystal operation (times: 8) |
| Reaction temperature |  | ° C. | 140 | 115 | 140 | 140 | 140 | 80 | 25 |
| Surface treatment | Stearic acid amount for treatment | — | 0.6 | 2.5 | 2.5 | 0 | 0.6 | 2.5 | 2.5 |
|  | Treatment method | — | Wet method | Wet method | Wet method | Wet method | Dry method | Wet method | Wet method |
| Particle properties | Average secondary particle size (according to laser diffraction) | μm | 1.2 | 0.5 | 1.2 | 1.2 | 1.2 | 3.5 | 3.9 |
|  | BET specific surface area | m²/g | 5 | 13 | 5 | 5 | 5 | 7 | 42 |
|  | Average primary particle size (according to SEM observation) | μm | 0.8 | 0.3 | 0.8 | 0.8 | 0.8 | 0.3 | 0.05 |
|  | Degree of monodispersion | % | 67 | 60 | 67 | 67 | 67 | 9 | 1 |
|  | pH after potentiometric titration | — | 7.9 | 7.7 | 7.5 | 10.0 | 9.1 | 9.6 | 9.9 |
| EEA resin properties | Kneading torque | kg · m | 4.3 | 4.2 | 3.6 | 4.6 | 4.1 | 4.8 | 5.0 |
|  | Judgment | — | Good | Good | Good | Bad | Good | Bad | Bad |
|  | Tensile strength | kgf/mm² | 0.84 | 0.89 | 0.90 | 0.85 | 0.72 | 0.82 | 0.80 |
|  | Judgment | — | Good | Good | Good | Good | Bad | Good | Good |
|  | Tensile elongation | % | 1100 | 1000 | 1240 | 350 | 990 | 1060 | 150 |
|  | Judgment | — | Good | Good | Good | Bad | Good | Good | Bad |

As is evident from Table 1, the flame retardant of each of Examples was good in dispersibility in the resin, and the shaped body obtained therefrom was good in properties. It is believed that the surface treatment level of the magnesium hydroxide particles constituting the flame retardant was sufficient so that the flame retardant was improved in dispersibility in the resin and further reaction between the resin and the flame retardant was sufficiently restrained. However, Comparative Example 1 was raised in kneading torque, and was low in tensile elongation. It is considered that this was caused by the fact that the pH after the nitric acid titration was so high that the surface treatment level was lowered although the form itself of the magnesium hydroxide particles had no problem. Comparative Example 2 was lowered in tensile strength. It is considered that this was caused by the fact that the surface treatment was conducted by the dry method so that the surface treatment was unable to be conducted at a high level. Comparative Example 3 was raised in kneading torque. Moreover, Comparative Example 4 was raised in kneading torque, and was low in tensile elongation. It is considered that the results of Comparative Examples 3 and 4 were caused by the fact that the magnesium hydroxide particles aggregated and thus the proportion of the magnesium hydroxide particles present in a secondary particle form was high so that the surface treatment level of particles near the respective centers of the aggregates was lowered.

The invention claimed is:

1. A flame retardant comprising magnesium hydroxide particles subjected to a surface treatment, the particles satisfying the following (A) to (D):
   (A) an average particle size is 2μm or less according to a laser diffraction method;
   (B) a BET specific surface area is 3 to 15 m$^2$/g;
   (C) a degree of mono-dispersion is 50% or more, the degree of mono-dispersion being represented by the following equation:

Degree of mono-dispersion (%)=(average primary particle size [μm] of particles according to SEM observation/average particle size [μm] of particles according to laser diffraction method)× 100; and (D) just after 1 mL of a 0.1 M solution of nitric acid is dropwise added at a dropping rate of 0.1 mL/minute to a suspension obtained by adding 1.0 g of the flame retardant to 100 mL of an aqueous mixed solution containing 0.1% by weight of each of a wetting agent and an electrolyte, pH of the suspension is 7.5 or more and 9.0 or less according to a potentiometric titration.

2. The flame retardant according to claim 1, wherein the surface treatment is conducted by use of at least one selected from the group consisting of higher fatty acids, higher fatty acid alkali metal salts, coupling agents, esters made from a fatty acid and a polyhydric alcohol, and phosphates made from phosphoric acid and a higher alcohol.

3. The flame retardant according to claim 1 or 2, wherein the surface treatment is conducted by a wet method.

4. A flame retardant composition, comprising an organic polymeric material, and the flame retardant according to claim 1 or 2 in an amount of 5 to 500 parts by mass based on 100 parts by mass of the organic polymeric material.

5. A shaped body obtained by use of the flame retardant composition according to claim 4.

6. The flame retardant according to claim 1, wherein average particle size is 1.2 μm or less according to a laser diffraction method.

* * * * *